United States Patent
Melia (10) Patent No.: US 6,481,744 B2
(45) Date of Patent: Nov. 19, 2002

(54) DETACHABLE SUPPORT SYSTEM FOR INFLATABLE AIR BAG CUSHION

(75) Inventor: Sharon K Melia, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/738,381

(22) Filed: Dec. 15, 2000

(65) Prior Publication Data

US 2002/0074778 A1 Jun. 20, 2002

(51) Int. Cl.$^7$ ................................................ B60R 21/22
(52) U.S. Cl. ................................ 280/730.2; 280/730.1; 280/728.2
(58) Field of Search ............................ 280/728.1, 728.2, 280/728.3, 730.1, 730.2

(56) References Cited

U.S. PATENT DOCUMENTS

| | | | | |
|---|---|---|---|---|
| 4,348,037 A | * | 9/1982 | Law et al. ................... | 280/733 |
| 5,335,936 A | * | 8/1994 | Faigle et al. ................. | 280/728 |
| 5,364,123 A | * | 11/1994 | Abramczyk et al. ........ | 280/728 |
| 5,398,958 A | * | 3/1995 | Taggart ....................... | 280/728 |
| 5,480,183 A | * | 1/1996 | Ward et al. ............... | 280/728.2 |
| 5,498,030 A | * | 3/1996 | Hill et al. ................. | 280/743.1 |
| 5,794,971 A | * | 8/1998 | Boydson et al. ............ | 280/733 |
| 6,022,044 A | * | 2/2000 | Cherry ..................... | 280/730.2 |
| 6,224,089 B1 | * | 5/2000 | Uchiyama et al. ........ | 280/728.2 |
| 6,079,735 A | * | 6/2000 | Fallmann et al. ........ | 280/730.2 |

FOREIGN PATENT DOCUMENTS

| | | | | |
|---|---|---|---|---|
| JP | 406115403 A | * | 4/1994 | ............. 280/728.2 |
| JP | 406247252 A | * | 9/1994 | ............. 280/728.3 |

* cited by examiner

*Primary Examiner*—Brian L. Johnson
*Assistant Examiner*—Kelly E Campbell
(74) *Attorney, Agent, or Firm*—Kathryn A. Marra (57) ABSTRACT

A support system for a folded inflatable air bag cushion deployable from a stored position over an area of extended length wherein the support system promotes the maintenance of a desired folding pattern along the length of the air bag cushion during the installation process and thereafter until deployment takes place. The support system includes one or more pliable cradle elements extending from a first support surface in cradling relation at least partially around the folded inflatable air bag cushion. The cradle elements are releasably attached to a second support surface such that upon inflation of the air bag cushion the cradle elements are detached from the second support surface and moved out of cradling relation around the inflatable air bag cushion.

18 Claims, 6 Drawing Sheets

DETACHABLE SUPPORT SYSTEM FOR INFLATABLE AIR BAG CUSHION

TECHNICAL FIELD

The present invention relates to an inflatable air bag cushion stored in folded relation over an elongate region adjacent to a surface to be covered by the air bag cushion upon inflation, and more particularly to a support system for releasably cradling a folded air bag cushion of elongate geometry in a supportive manner prior to deployment.

BACKGROUND OF THE INVENTION

It is well known in motor vehicles to provide air bag cushions for protecting a vehicle occupant wherein such air bag cushions are in fluid communication with gas generating inflators so as to inflate the cushion upon the occurrence of predetermined conditions such as deceleration exceeding a certain level. It is further known to provide air bag systems including inflatable restraint cushions which are deployable from positions of attachment to the vehicle frame along extended lengths so as to extend downwardly from the location of storage in a substantially curtain-like fashion so as to cover a portion of the vehicle surface adjacent to the location of cushion storage. Such coverage may be particularly useful in providing cushioning restraint for an occupant seated within the occupant compartment of the vehicle during a side impact or extended roll-over collision event. In such applications, the curtain-like air bag cushion is typically deployed downwardly over a portion of the interior of the occupant compartment from a folded storage position extending substantially along the roof rail of the vehicle frame.

Prior to deployment of an air bag cushion of substantially curtain-like character, such cushions are typically stored in a folded condition hidden from view by a head liner and/or appropriate trim elements. Such head lining and/or trim elements thereby provide the dual function of hiding the air bag cushion from view while also providing a degree of underlying support to the folded cushion. Upon inflation of such a stored air bag cushion, the covering head lining and/or trim is broken away as the air bag cushion expands over the area of coverage.

In order to realize desired inflation characteristics, the air bag cushion is typically folded according to a predetermined pattern that is thereafter maintained until the air bag cushion is deployed from its position of storage. It has been found that the introduction and subsequent maintenance of the desired folding pattern during installation is sometimes difficult to achieve during typical installation practices. This difficulty may be particularly acute for air bag cushions of substantial length due to the propensity of such cushions to sag if not supported during the folding process. Accordingly, in order to assure the achievement of desired storage conditions, a substantial degree of time and effort may be required during the installation process.

SUMMARY OF THE INVENTION

This invention provides advantages and alternatives over the prior art by providing a support system for a folded inflatable air bag cushion deployable from a stored position over an area of extended length within the passenger compartment of a transportation vehicle wherein the support system promotes the maintenance of a desired folding pattern along the length of the air bag cushion during the installation process and thereafter until deployment takes place.

The support system of the present invention utilizes one or more pliable cradle elements extending from a first support surface in cradling relation at least partially around the folded inflatable air bag cushion. The cradle element is releasably attached to a second support surface such that upon inflation of the air bag cushion the cradle element is detached from the second support surface and moved out of cradling relation around the inflatable air bag cushion. The support system of the present invention thus provides a substantial aid to the installer of the air bag cushion by providing support along the length of the cushion to any extent as may be necessary to avoid undue sagging during the installation process. The support system provides the further benefit of providing continued support to the inflatable air bag cushion until deployment may take place. Such support is provided without adversely affecting the deployment of the air bag cushion.

In accordance with one aspect of the present invention both the cradle element and the inflatable air bag cushion may be fixedly attached along the roof rail portion of the vehicle frame such that upon deployment, the air bag cushion is disposed between the pliable cradle element and the vehicle frame. This relationship permits the free end of the cradle element to be wrapped around the air bag cushion and back into contacting relation with the vehicle frame.

In accordance with another aspect of the present invention it is contemplated that the free end of the cradle element may be releasably attached to a portion of the vehicle frame and/or to the surface of the inflatable air bag cushion prior to deployment such that upon inflation of the air bag cushion the free end of the cradle element is forced away from its cradling position around the air bag cushion.

Advantageously, the support system of the present invention provides a highly efficient mechanism for supporting an inflatable air bag cushion of extended length over a prolonged period of time without undue interference with the deployment characteristics of such a cushion. The incorporation of such a system may provide benefits during installation and storage of the air bag cushion and is thus believed to represent a useful advancement over the state of the art.

BRIEF DESCRIPTION OF THE DRAWINGS

The accompanying drawings which are incorporated in and which constitute a part of this specification illustrate several potentially preferred embodiments of the present invention and, together with the general description of the invention given above and the detailed description set forth below, serve to explain the principles of the invention wherein.

While the invention has been illustrated and generally described above and will hereinafter be described in connection with certain potentially preferred embodiments, practices and procedures, it is to be understood that in no event is the invention to be limited to such embodiments, practices and procedures. On the contrary, it is intended that the present invention shall extend to any alternative or modification as may embrace the broad principles of this invention within the true spirit and scope thereof.

DESCRIPTION OF THE PREFERRED EMBODIMENTS

Figure 1:
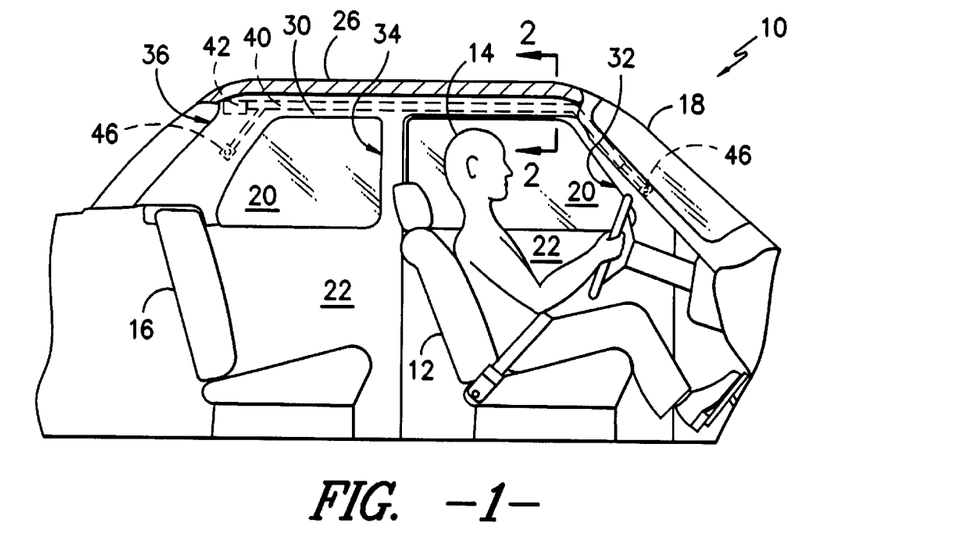
FIG. 1 is a cut-away view of the interior of an automotive vehicle incorporating a folded curtain-like air bag cushion stored along the occupant compartment.

Turning now to the drawings wherein like reference numerals have been utilized to designate corresponding components throughout the various views, in FIG. 1 there is illustrated a vehicle 10 such as an automotive vehicle as will be well known to those of skill in the art. The vehicle 10 includes a front seat 12 which may be used to support a front seated occupant 14. The vehicle 10 may further include a rear seat 16 which may be used to support a rear occupant (not shown). In order to provide visibility to the occupants of the vehicle 10, the vehicle 10 is provided with a windshield 18 as well as with one or more side windows 20. As illustrated, the side windows 20 are located generally adjacent to the seats 12, 16 to the sides of the occupant seated therein. The vehicle 10 may also include one or more doors 22 which extend adjacent to the vehicle occupants and towards a roof 26.

As will be appreciated by those with skill in the art, the vehicle 10 preferably includes a structural frame formed from an arrangement of structural support members including a roof rail 30 disposed at the intersection between the doors 22 and the roof 26. The vehicle 10 may also include a series of structural support pillars 32, 34, 36 which extend downwardly from the roof rail 30. The structural support pillar 32 which extends between the windshield 18 and the side window 20 adjacent to the front seat 12 is commonly referred to as the "A" pillar. The structural support pillar 34 which is disposed intermediate the side windows is commonly referred to as the "B" pillar. The structural support pillar 36 which is disposed rearward of the side window 20 adjacent to the rear seat 16 is commonly referred to as the "C" pillar. As will be appreciated, each of the structural support pillars 32, 34, 36 are preferably covered by a trim piece.

Figure 2:
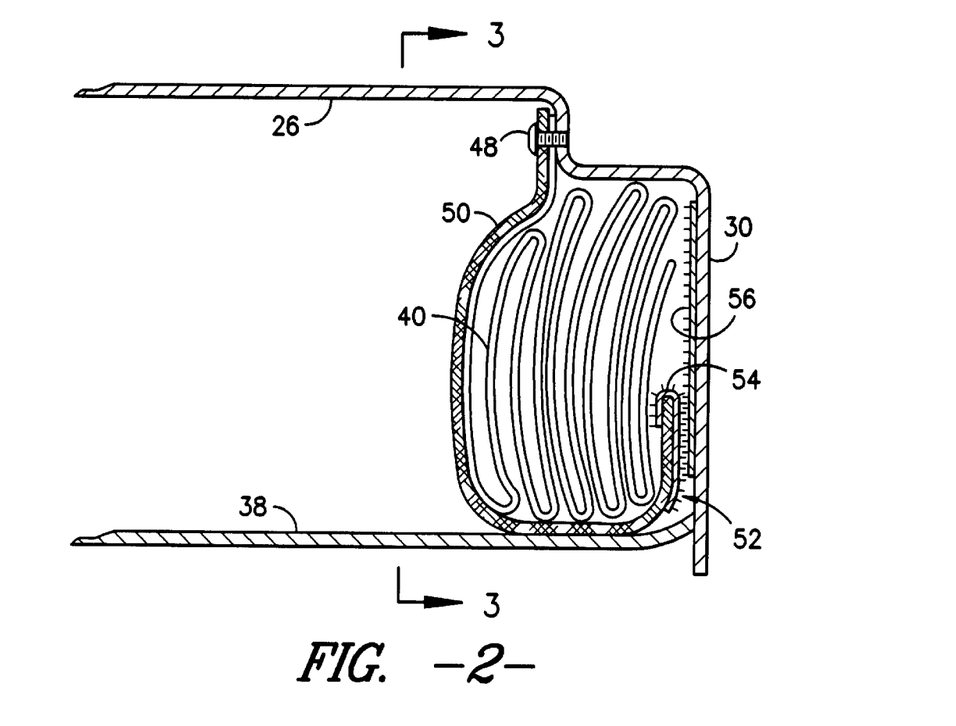
FIG. 2 is a view taken generally along line 2—2 in FIG. 1 and illustrating a folded inflatable air bag cushion supported by a support system in accordance with the present invention.
Figure 3:
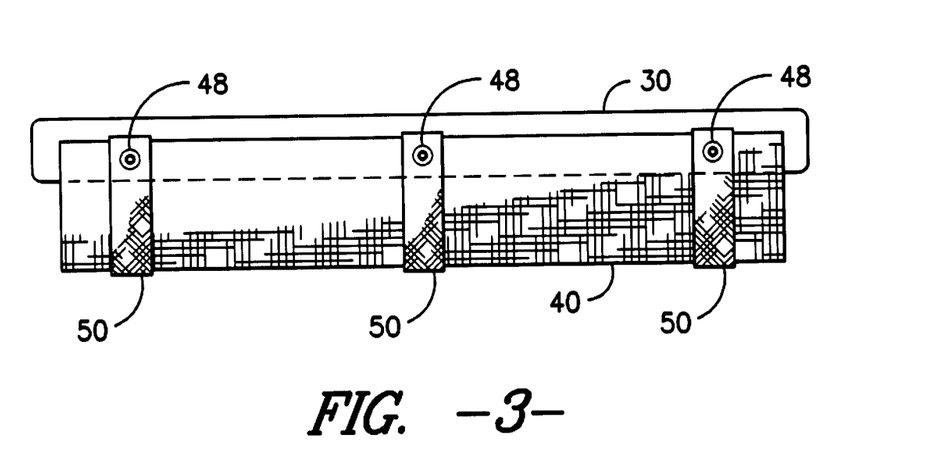
FIG. 3 is a view taken generally along line 3—3 in FIG. 2 and illustrating a first embodiment of a support system in accordance with the present invention.

As best illustrated in FIGS. 2 and 3, an inflatable air bag cushion 40 is stored in folded relation in the region extending at least partially along the length of the roof rail 30. As will be appreciated, by the term "folded" is meant any compacted arrangement of the material forming the air bag cushion 40 including, by way of example only, a serpentine fold, an accordion fold, and/or a rolled configuration.

The folding arrangement for the air bag cushion 40 is preferably such that the inflation of the air bag cushion 40 will give rise to a rapid deployment of the body of the air bag cushion 40 away from the roof rail 30 without substantial hindrance. As illustrated, both the roof rail 30 and the folded air bag cushion 40 may be hidden from view by a headlining material 38 such as a foam backed fabric laminate as will be well known to those of skill in the art. It is likewise contemplated that the air bag cushion 40 and roof rail 30 may be covered by a frangible trim piece of plastic or the like as will be well known to those of skill in the art.

As will be appreciated, while the air bag cushion 40 is illustrated in FIG. 1 as extending along substantially the entire length of the occupant compartment within the vehicle 10, it is likewise contemplated that the air bag cushion 40 may extend over some diminished region if desired such as over some portion of the region extending between the "A" pillar 32 and the "B" pillar 34. As will be understood, such an arrangement may be useful in the event that the transportation vehicle 10 does not incorporate any rear seat 16.

As shown in FIG. 1 the air bag cushion 40 is preferably in fluid communication with a gas discharging inflator 42 as is well known to those of skill in the art such that gas may be discharged from the inflator 42 and into the air bag cushion 40 to effect expansion and deployment of the air bag cushion 40 outwardly from its initial storage position and over an adjacent portion of the passenger compartment. The air bag cushion may be attached to tethering elements 46 to provide stability upon deployment. According to a potentially preferred practice, the air bag cushion 40 is secured to the roof rail 30 by a series of fastening elements 48 such as screws or snap-in fasteners as will be well know to those of skill in the art.

Figure 3A:
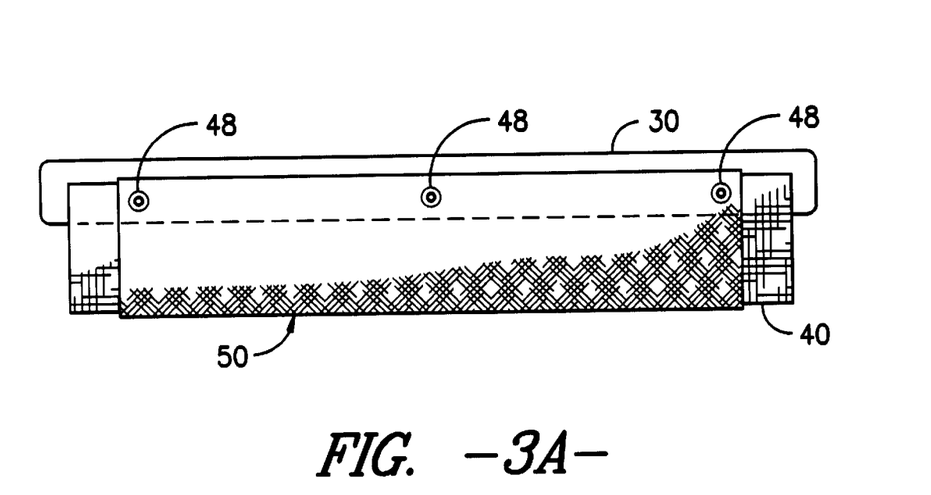
FIG. 3A is a view similar to FIG. 3 and illustrating a second embodiment of a support system in accordance with the present invention.

As best seen through simultaneous reference to FIGS. 2, 3 and 3A, the fastening elements 48 which are utilized to secure the air bag cushion 40 in place along the roof rail 30 may also hold in place one or more pliable cradle elements 50 which extend away from the fastening elements 48 and pass in surrounding relation at least partially around the exterior of the folded air bag cushion 40. By way of example only, it is contemplated that the pliable cradle elements may be in the form of substantially discrete strap-like structures (FIG. 3) or may also be in the form of a one piece apron-like structure (FIG. 3A).

As illustrated in FIG. 2, the pliable cradle elements 50 preferably include an attachment surface 52 at a position removed from the location of attachment to the fastening elements 48. It is contemplated that the attachment surface 52 will incorporate a releasable attachment mechanism such as a cradle surface covering 54 forming one-half of a hook and loop fabric construction. As illustrated, a cooperating structural surface covering 56 forming the other half of a hook and loop fabric construction is attached by adhesive or other means in cooperating relation along a portion of the roof rail 30. As shown, such a relationship secures the attachment surface 52 of the pliable cradle element in place adjacent the roof rail 30. The pliable cradle element 50 thereby provides an underlying structural support for the folded air bag cushion 40.

As previously indicated, is contemplated that both the number and configuration of the pliable cradle elements may be varied greatly in application of the present invention depending upon design preferences. It is also contemplated that a wide range of materials may be used to form the pliable cradle elements 50. By way of example only, and not limitation, it is contemplated that useful materials may include textile fabric constructions including woven, non-woven and knitted constructions as well as polymeric film constructions. One potentially preferred material is textile seat belt webbing as will be well known to those of skill in the art.

Figure 4:
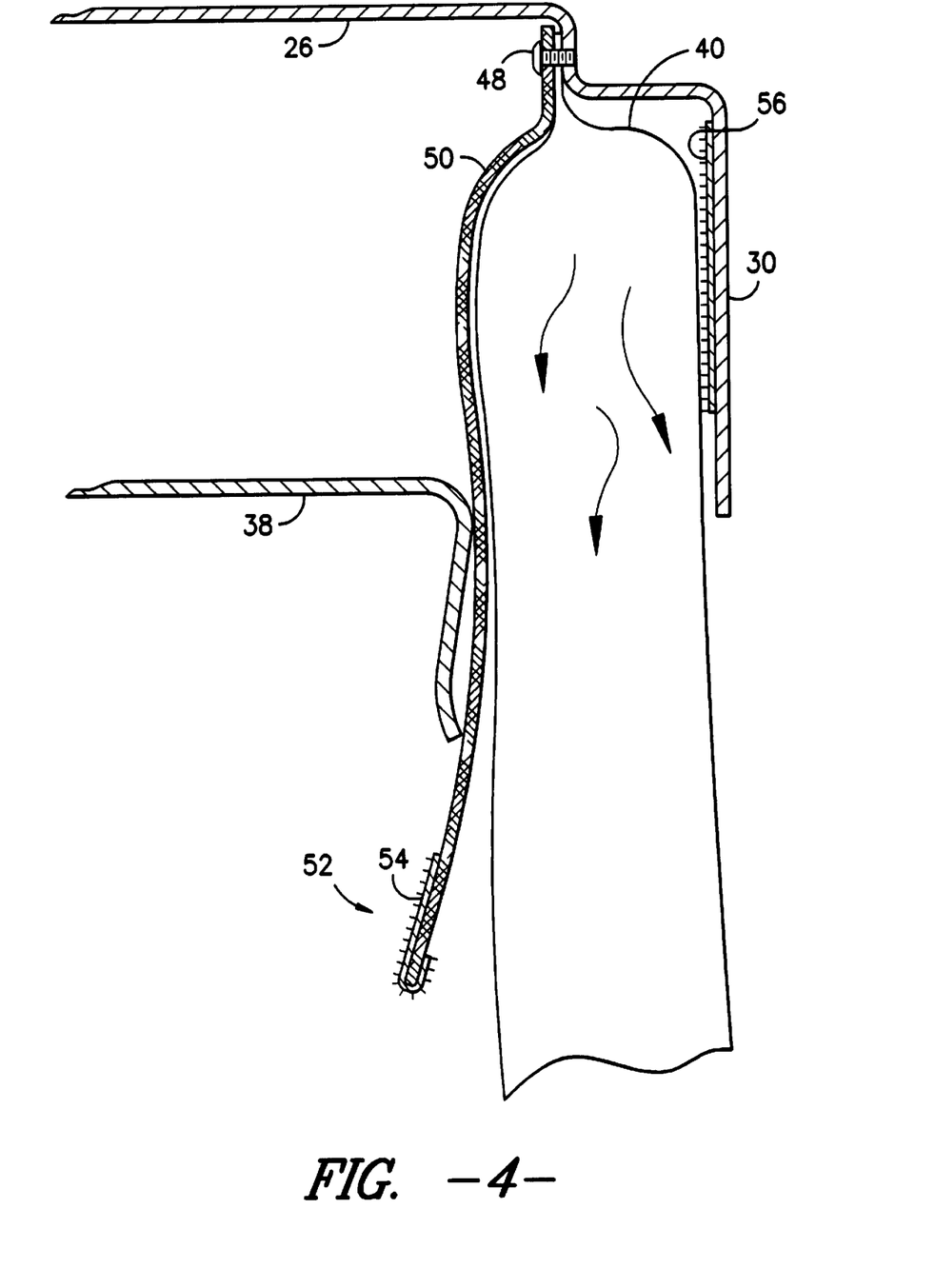
FIG. 4 is a view similar to FIG. 2 following deployment of the air bag cushion.

Notwithstanding the actual configuration or character of the pliable cradle elements 50, such elements serve to provide a degree of cradling support to the folded air bag cushion 40 until the air bag cushion 40 is inflated and deployed away from its location of storage. As best illustrated in FIG. 4, upon such deployment, the air bag cushion 40 applies pressure against the pliable cradle elements 50 thereby forcing the cradle surface covering 54 to detach from the structural surface covering 56 and thereby eliminate the cradling relation of the pliable cradle elements around the air bag cushion 40. Due to the releasable nature of the attachment between the cradle surface covering 54 and the structural surface covering 56 and due to the substantially pliable nature of the cradle elements 50, the continued deployment of the air bag cushion 40 may thereafter progress without substantial interference.

Figure 5:
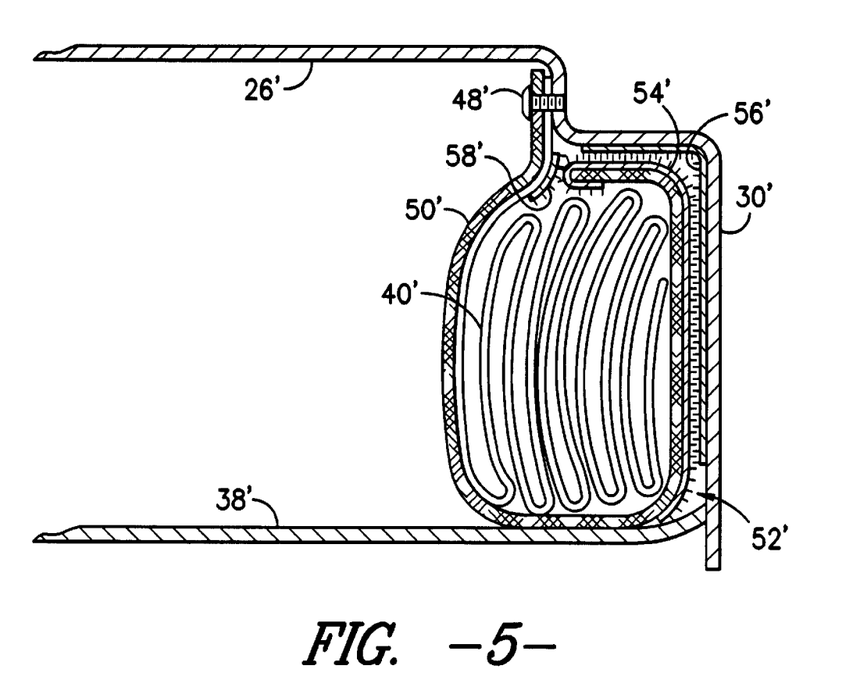
FIG. 5 is a view similar to FIG. 2 illustrating another embodiment of a support system in accordance with the present invention.

It will be appreciated that the present invention is susceptible to a broad range of constructions as may incorporate principles of the present invention. By way of example only, in FIG. 5 there is illustrated one such alternative embodiment of the invention having a description generally similar to that of FIGS. 1–4 and in which similar components are denoted by similar reference numerals with a prime. As illustrated, in the embodiment of FIG. 5, the attachment surface 52' spans an extended length of the pliable cradle element 50' to substantially correspond with an extended coverage of the structural surface covering 56' over the surface of the roof rail 30. As will be appreciated, the increased engagement length resulting such extended coverage may give rise to a stronger mechanical bond holding the pliable cradle element 50' in position prior to deployment of the air bag cushion 40'. In addition, the air bag cushion 40' includes a connective surface structure 58' such as one-half of a hook and loop fabric substantially similar in character to the structural surface covering 56'. This connective structure 58' which may be seamed to the surface of the air bag cushion 40 provides a location of attachment for the distal end of the pliable cradle elements 50' thereby permitting the pliable cradle elements 50' to extend in substantially complete enclosing relation around the air bag cushion 40. It is contemplated that such complete enclosure with enhanced supporting attachment to adjacent support surfaces may be useful in providing cradling support to air bag cushions 40' of greater mass such as air bag cushions incorporating substantial internal tethering elements, linings, and/or permeability blocking coatings as are well known to those of skill in the art. Moreover, the utilization of the connective surface structure 58' on the surface of the air bag cushion 40' may help to insure that the pliable cradle elements 50' are wrapped around the air bag cushion 40' in a substantially straight path which may be desirable in some instances.

Figure 6:
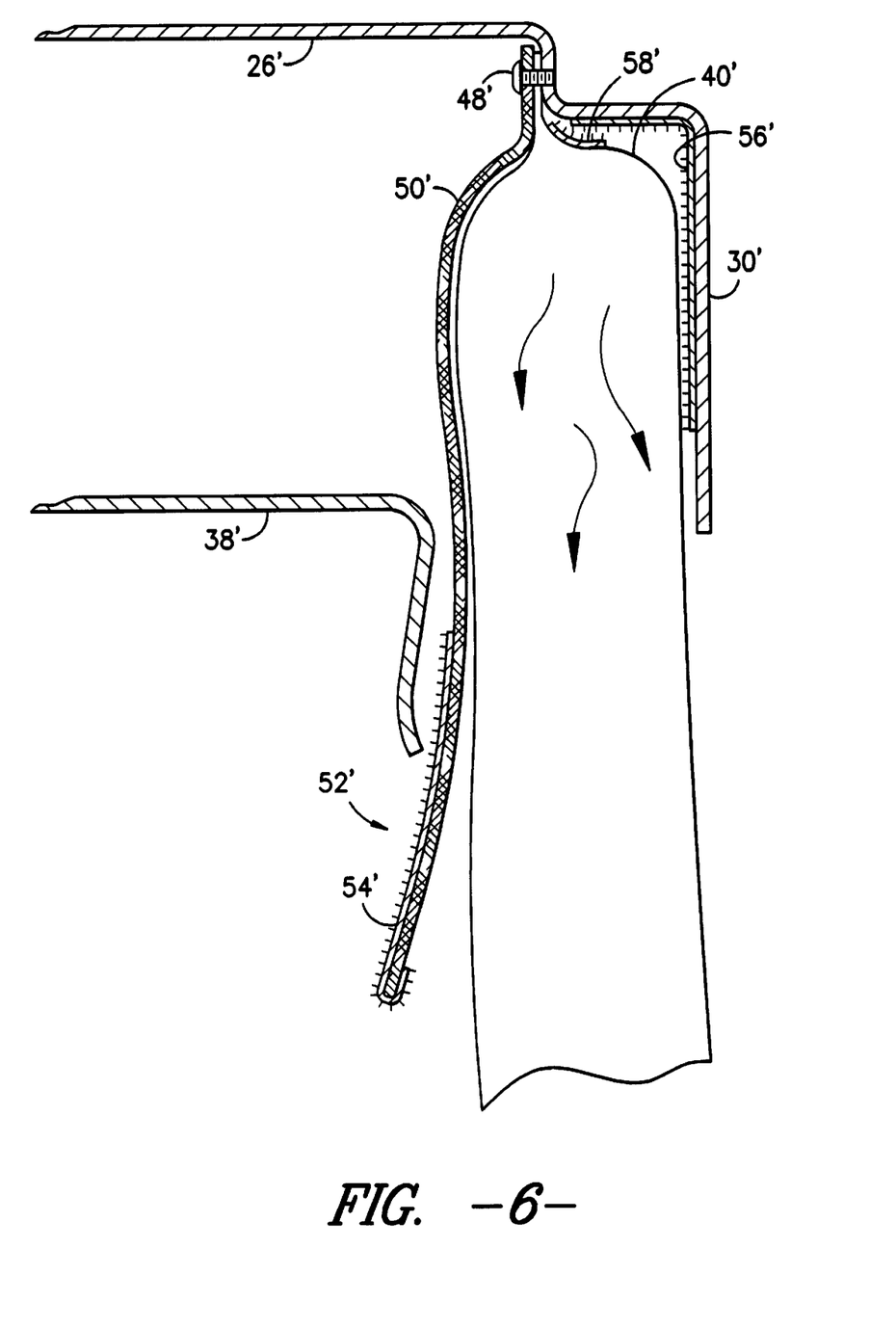
FIG. 6 is a view similar to FIG. 5 following deployment of the air bag cushion.
Figure 7:
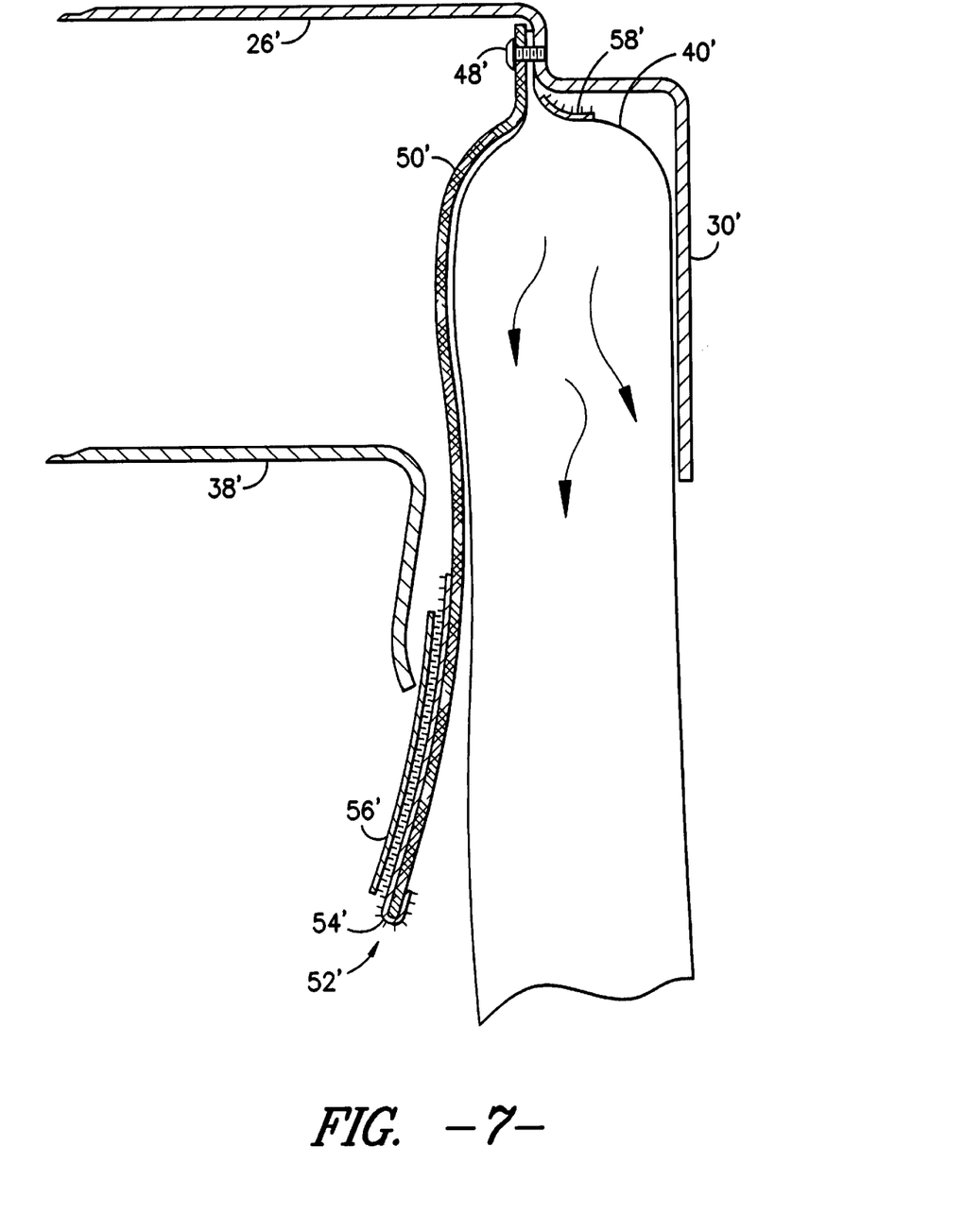
FIG. 7 is a view similar to FIG. 6 exhibiting an alternative performance characteristic of a support system according to the present invention.

As will be appreciated, due to the substantial length of the attachment surface 52' across the pliable cradle element 50', the structural surface covering 56' will be subjected to a substantial pulling force as the cradle element 50' is forced away from its position of cradling support. It is contemplated that under some conditions this force may give rise to a separation of the structural surface covering 56' from its underlying support structure. However, as best seen through simultaneous reference to FIGS. 6 and 7 whether or not such separation does take place, the performance of the pliable cradle elements 50' is substantially identical. Accordingly, in either instance deployment of the air bag cushion 40' takes place substantially without interference from the cradle elements 50'. It is believed that this performance feature of the present invention is potentially beneficial in that it permits the structural surface covering 56' to be applied across the surface of the roof rail 30' by a relatively light coat of adhesive without concern of adversely impacting performance if the bond formed by such adhesive is overcome during deployment of the air bag cushion 40'.

It is to be understood that while the present invention has been illustrated and described in relation to certain potentially preferred embodiments, constructions, and procedures, that such embodiments, constructions, and procedures are illustrative only and that the present invention is in no event to be limited thereto. Rather, it is contemplated that modifications and variations embodying the principles of this invention will no doubt occur to those of skill in the art. It is thus contemplated and intended that the invention shall extend to all such modifications and variations as may incorporate the broad aspects of the invention within the full spirit and scope of the appended claims and all equivalents thereto.

What is claimed is:

1. A support system for a folded inflatable air bag cushion, the support system extending over an area within tie occupant compartment of a transportation vehicle, the support system comprising:

a pliable cradle element secured in substantially fixed relation to a first support surface, the cradle element including a first segment extending away from the first support surface inboard of the folded inflatable air bag cushion and a second segment extending about 90 degrees or greater away from the first segment in underlying supporting relation to the folded inflatable air bag cushion, the second segment including an attachment surface releasably attached to a second support surface, such that the cradle element defines a supporting sling extending about 180 degrees or greater around the folded inflatable air bag cushion and such that upon inflation of the folded inflatable air bag cushion, the cradle element is detached from the second support surface and moved out of cradling relation around the inflatable air bag cushion.

2. The invention according to claim 1, wherein the pliable cradle element comprises a length of textile fabric.

3. The invention according to claim 2, wherein the textile fabric comprises a seat belt webbing fabric.

4. The invention according to claim 1, wherein the pliable cradle element comprises a length of pliable polymeric film.

5. The invention according to claim 1, wherein the folded inflatable air bag cushion is disposed in folded relation along at least a portion of a structural roof rail extending along the occupant compartment of the vehicle such that upon inflation the inflatable air bag cushion expands downwardly away from the roof rail and over an area substantially adjacent to an occupant within the occupant compartment.

6. The invention according to claim 5, wherein the first support surface comprises a portion of the roof rail.

7. The invention according to claim 5, wherein the second support surface comprises a portion of the roof rail.

8. The invention according to claim 1, wherein the cradle element attachment surface comprises a one half of a hook and loop fabric structure attached to a cooperating half of a hook and loop fabric structure disposed at the second support surface.

9. The invention according to claim 1, wherein the cradle element extends in loop forming fashion substantially entirely around the inflatable air bag cushion.

10. The invention according to claim 9, wherein a portion of the cradle element attachment surface is releasably attached to the surface of the air bag cushion.

11. The invention according to claim 10, wherein the cradle element attachment surface comprises a one half of a hook and loop fabric structure attached to a cooperating half of a hook and loop fabric structure disposed at the surface of the inflatable air bag cushion, whereby the second support surface comprises a surface of the inflatable air bag cushion.

12. A support system for a folded inflatable air bag cushion, the support system extending over an area within the occupant compartment of a transportation vehicle, the support system comprising:

a plurality of pliable cradle elements secured in substantially fixed relation to a first support surface, at least a portion of the cradle elements including a first segment extending away from the first support surface inboard of the folded inflatable air bag cushion and a second segment extending about 90 degrees or greater away from the first segment in underlying supporting relation to the folded inflatable air bag cushion, the second segment including an attachment surface releasably attached to a second support surface outboard of the folded inflatable air bag cushion, such that upon inflation of the inflatable air bag cushion, the cradle elements are detached from the second support surface and moved out of cradling relation around the inflatable air bag cushion.

13. The invention according to claim 12, wherein the folded inflatable air bag cushion is disposed in folded relation along at least a portion of a structural roof rail extending along the occupant compartment of the vehicle such that upon inflation the inflatable air bag cushion expands downwardly away from the roof rail and over a side portion of the occupant compartment substantially adjacent to an occupant within the occupant compartment.

14. The invention according to claim 13, wherein the first support surface comprises a portion of the roof rail.

15. The invention according to claim 14, wherein the second support surface comprises a portion of the roof rail.

16. The invention according to claim 12, wherein at least a portion of the cradle elements extend in loop forming fashion substantially entirely around the inflatable air bag cushion.

17. The invention according to claim 16, wherein a portion of the cradle element attachment surfaces are releasably attached to the surface of the air bag cushion.

18. A support system for a folded inflatable air bag cushion, the support system extending over an area within the occupant compartment of a transportation vehicle, the support system comprising:

a pliable cradle element including a proximal end secured in substantially fixed relation at a first attachment location on a structural roof rail extending along the occupant compartment of the vehicle, the pliable cradle element further including an attachment surface disposed at a location removed from the proximal end for releasable attachment at a second attachment location on the roof rail, the first attachment location on the roof rail being in substantially vertical alignment with the second attachment location on the roof rail, the cradle element extending away from the first attachment location in cradling relation substantially 360 degrees around the folded inflatable air bag cushion such that the attachment surface is releasably attached at the second attachment location whereby upon inflation of the inflatable air bag cushion, the attachment surface on the cradle element is forced away from the second attachment location and the cradle element is moved out of cradling relation around the inflatable air bag cushion.

* * * * *